(No Model.) 10 Sheets—Sheet 1.

L. EHRLICH & J. B. BENTON.
CASH REGISTER, INDICATOR, AND CHECK PRINTER.

No. 511,743. Patented Dec. 26, 1893.

(No Model.) 10 Sheets—Sheet 3.
L. EHRLICH & J. B. BENTON.
CASH REGISTER, INDICATOR, AND CHECK PRINTER.
No. 511,743. Patented Dec. 26, 1893.

Witnesses
Inventors:
Leo Ehrlich
John B. Benton,
By their Attorneys
Foster & Freeman (No Model.) 10 Sheets—Sheet 4.

L. EHRLICH & J. B. BENTON.
CASH REGISTER, INDICATOR, AND CHECK PRINTER.

No. 511,743. Patented Dec. 26, 1893.

Witnesses
Jno. G. Hinkel Jr.
W. S. McArthur

Inventors
Leo Ehrlich,
John B. Benton,
By their Attorneys
Foster & Freeman (No Model.) 10 Sheets—Sheet 7.

L. EHRLICH & J. B. BENTON.
CASH REGISTER, INDICATOR, AND CHECK PRINTER.

No. 511,743. Patented Dec. 26, 1893.

Witnesses:
Jno. G. Hinkel Jr.
H. S. McArthur

Inventors:
Leo Ehrlich &
John B. Benton,
By their Attorneys
Foster & Freeman (No Model.) 10 Sheets—Sheet 8.

L. EHRLICH & J. B. BENTON.
CASH REGISTER, INDICATOR, AND CHECK PRINTER.

No. 511,743. Patented Dec. 26, 1893.

Witnesses
Jno G Hinkel Jr
W. S. McArthur

Inventors:
Leo Ehrlich,
John B. Benton,
By their Attorneys
Foster & Freeman

THE NATIONAL LITHOGRAPHING COMPANY,
WASHINGTON, D. C.

(No Model.) 10 Sheets—Sheet 9.

L. EHRLICH & J. B. BENTON.
CASH REGISTER, INDICATOR, AND CHECK PRINTER.

No. 511,743. Patented Dec. 26, 1893.

Witnesses:
Jno. G. Hinkel Jr.
H. S. McArthur

Inventors:
Leo Ehrlich &
John B. Benton,
By their Attorneys
Foster Freeman

THE NATIONAL LITHOGRAPHING COMPANY,
WASHINGTON, D. C.

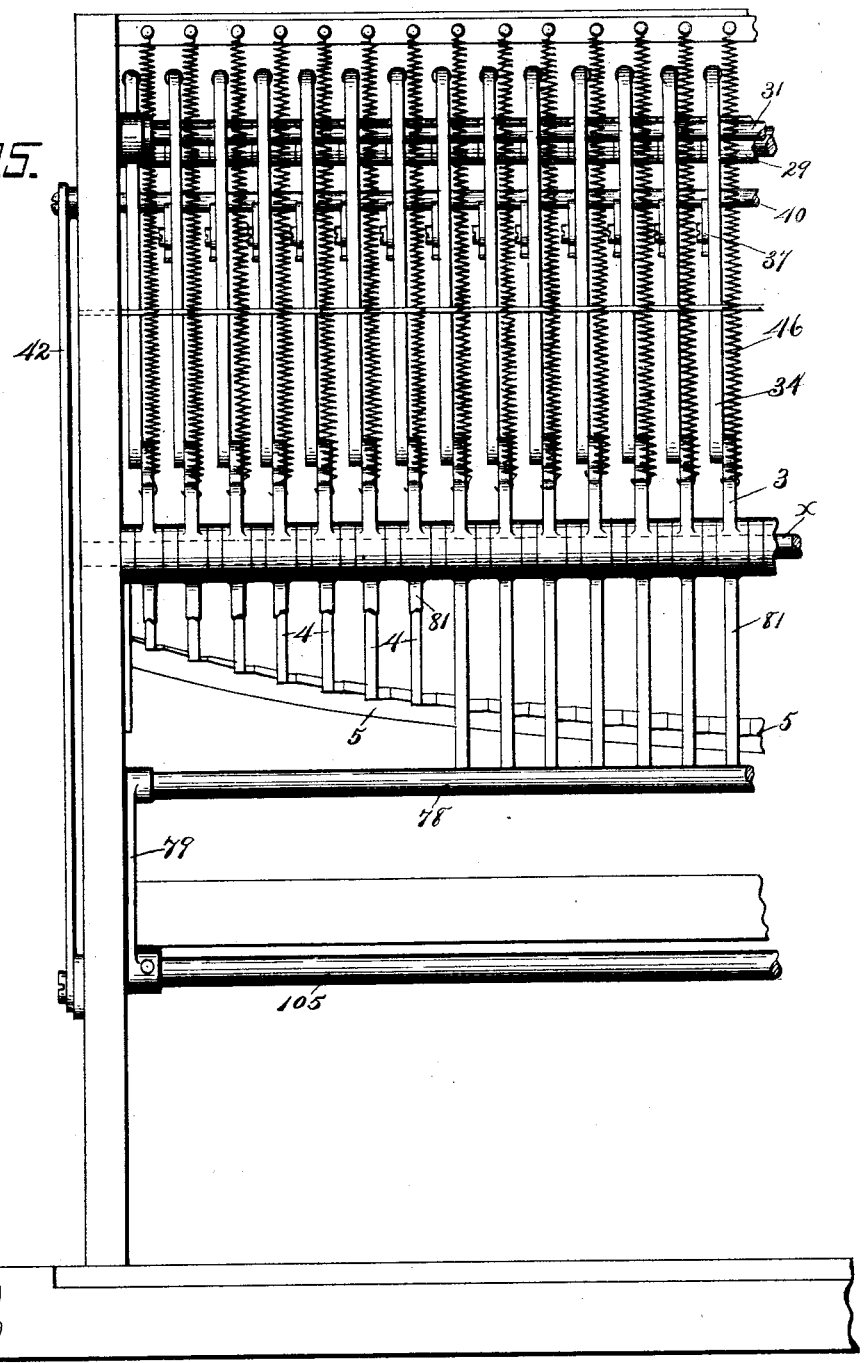

UNITED STATES PATENT OFFICE.

LEO EHRLICH, OF ST. LOUIS, MISSOURI, AND JOHN B. BENTON, OF NEW YORK, N. Y., ASSIGNORS, BY MESNE ASSIGNMENTS, TO THE NATIONAL CASH REGISTER COMPANY, OF DAYTON, OHIO.

CASH REGISTER, INDICATOR, AND CHECK-PRINTER.

SPECIFICATION forming part of Letters Patent No. 511,743, dated December 26, 1893.

Application filed October 7, 1889. Serial No. 326,170. (No model.)

*To all whom it may concern:*

Be it known that we, LEO EHRLICH, residing at St. Louis, in the State of Missouri, and JOHN B. BENTON, residing at New York, in the county of New York and State of New York, citizens of the United States, have invented certain new and useful Improvements in Cash Registers and Indicators, of which the following is a specification.

Our improved machine embodies an indicating, a registering and a printing mechanism, and various auxiliary devices co-operating therewith to insure their proper and accurate operation, and our invention relates to novel constructions and arrangements and combinations and modes of operation of the elements of these several mechanisms, all as will be hereinafter more fully explained and particularly pointed out in the claims.

Figure 1:
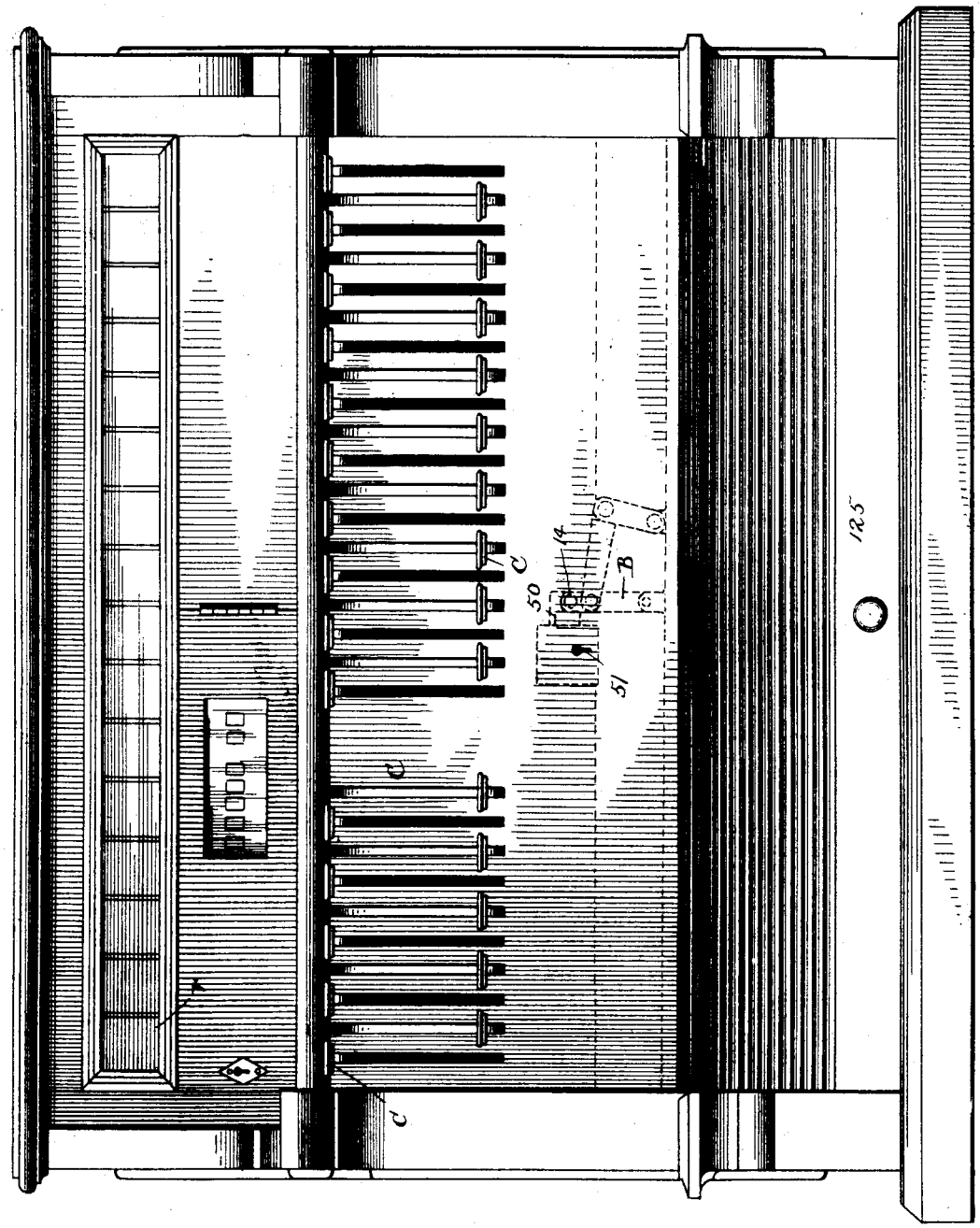
Figure 2:
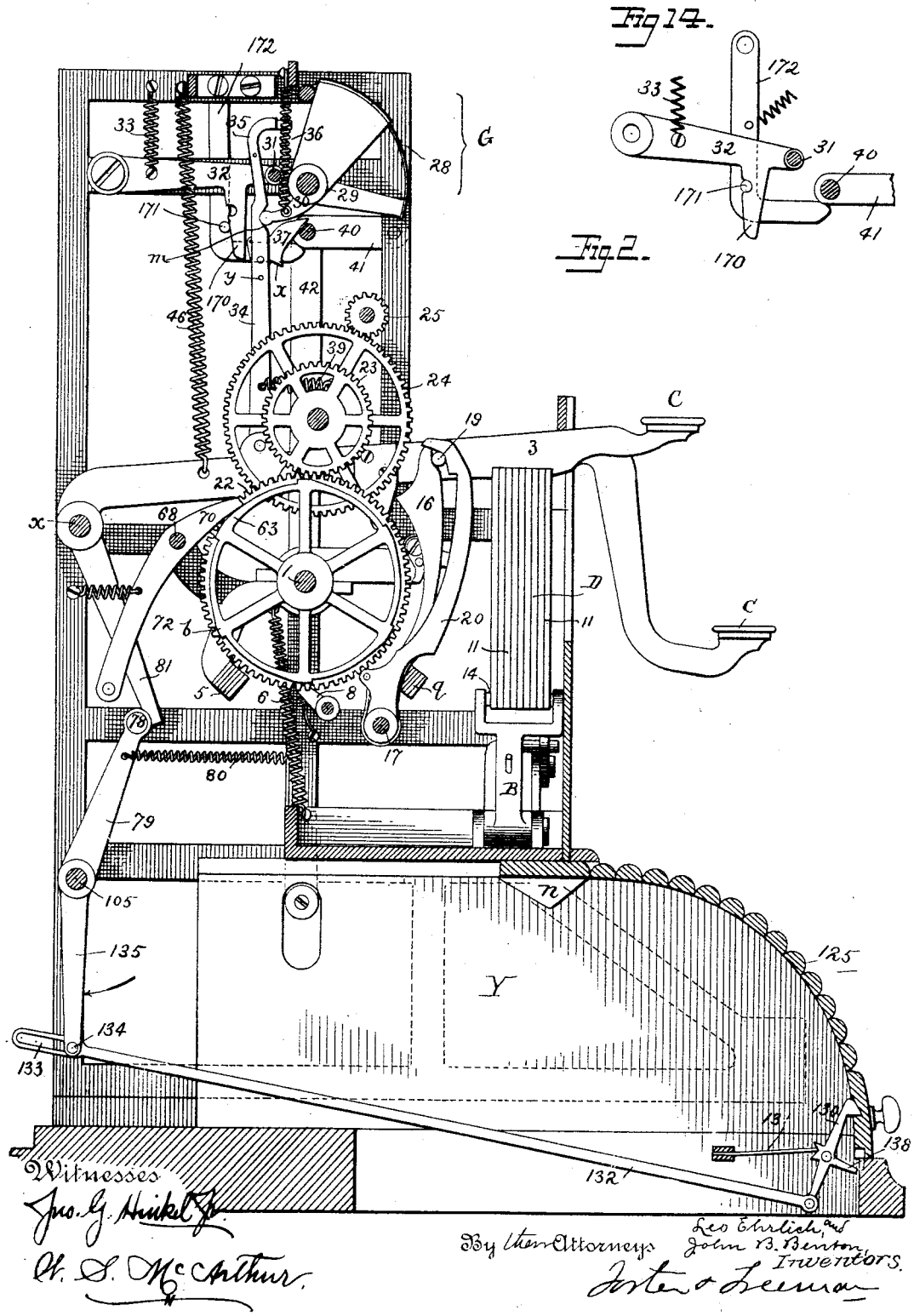
Figure 3:
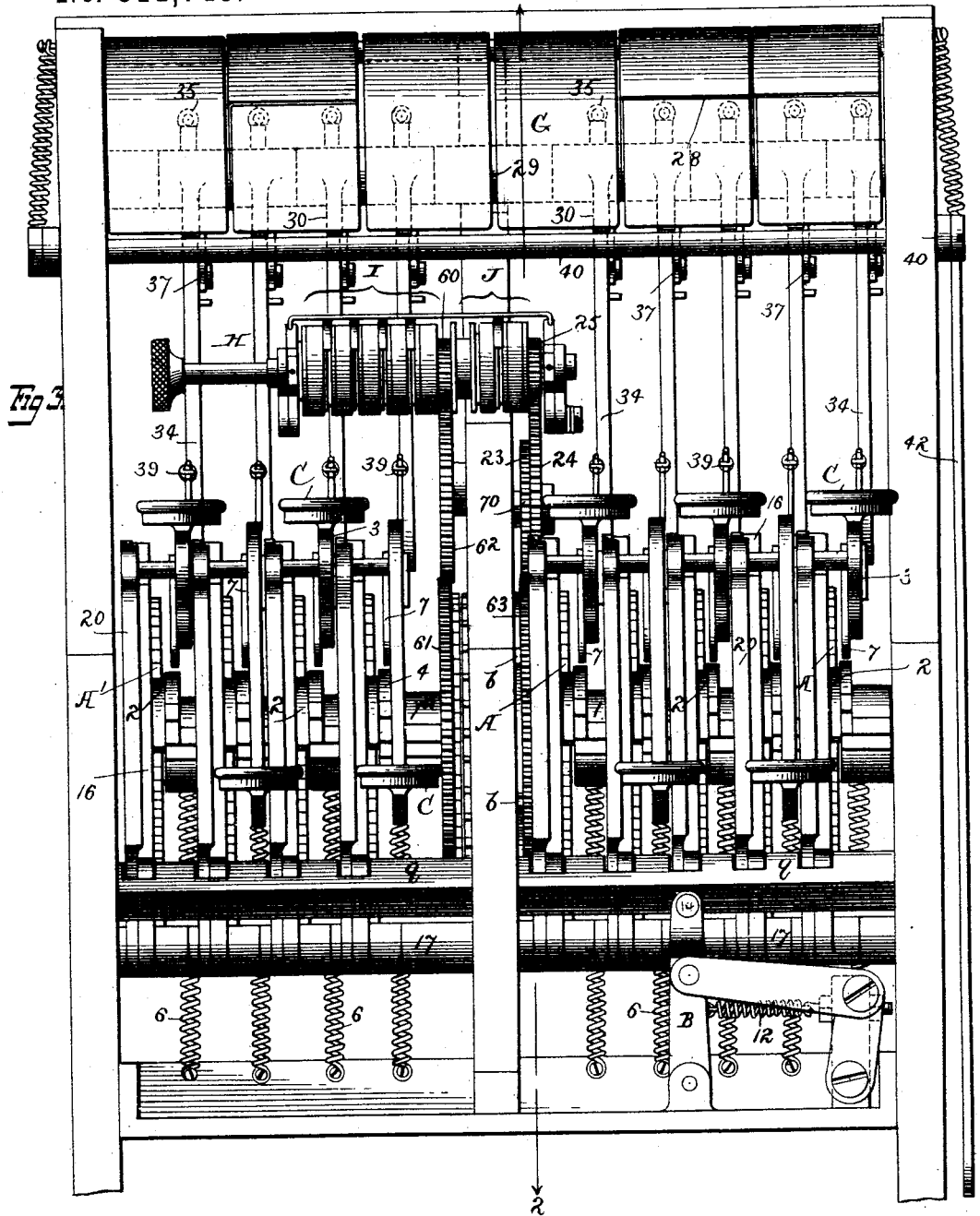
Figure 4:
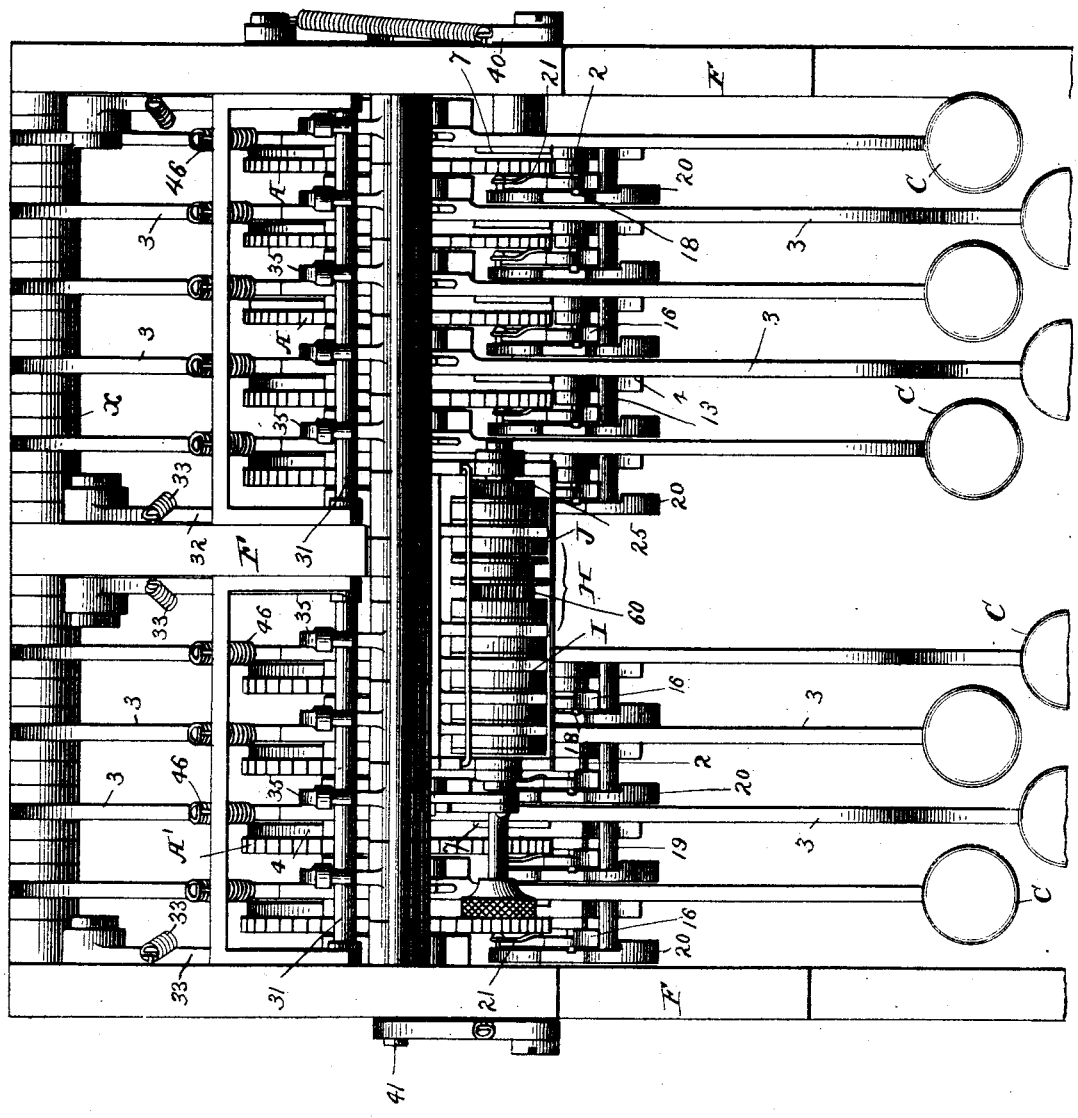
Figure 5:
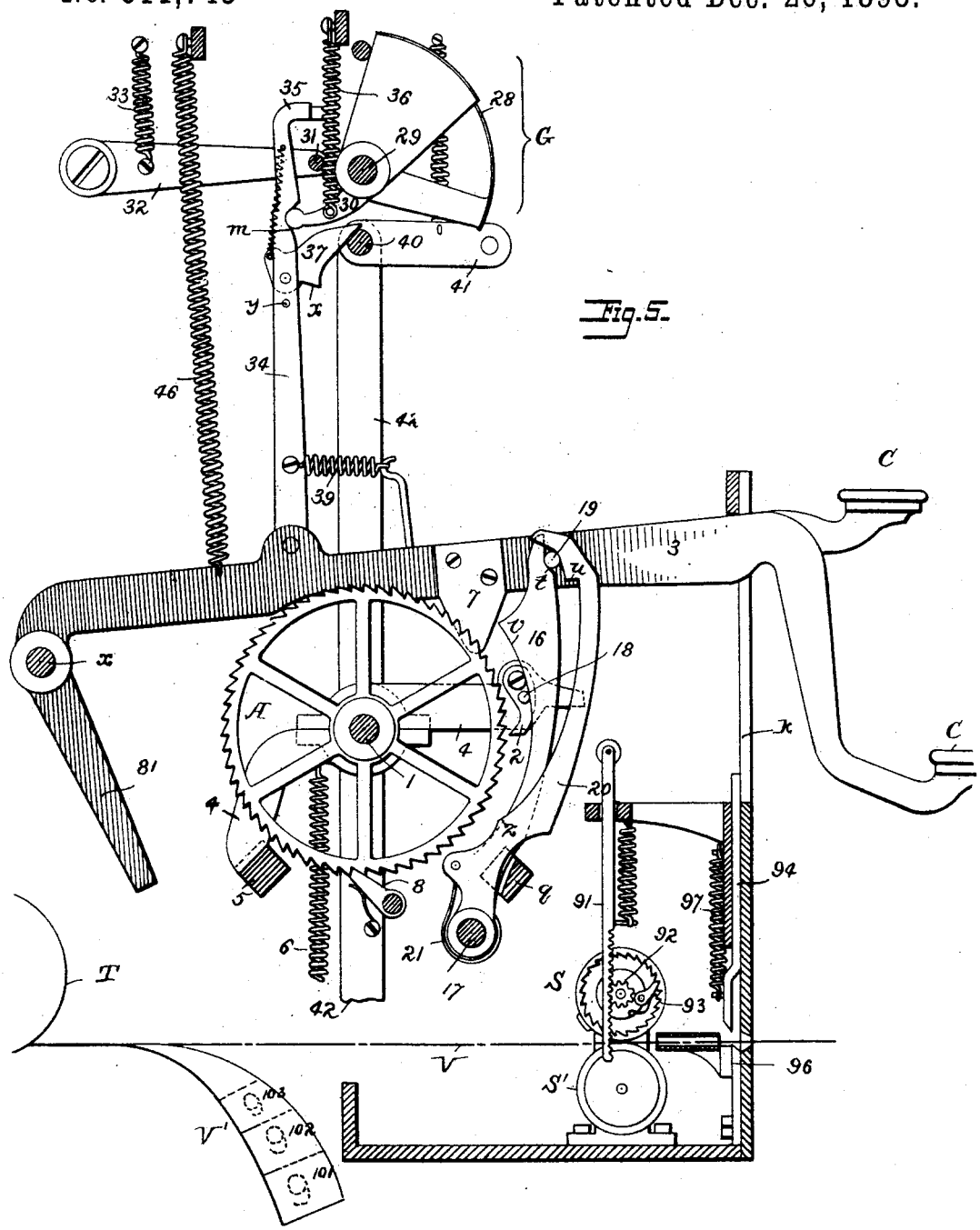
Figure 6:
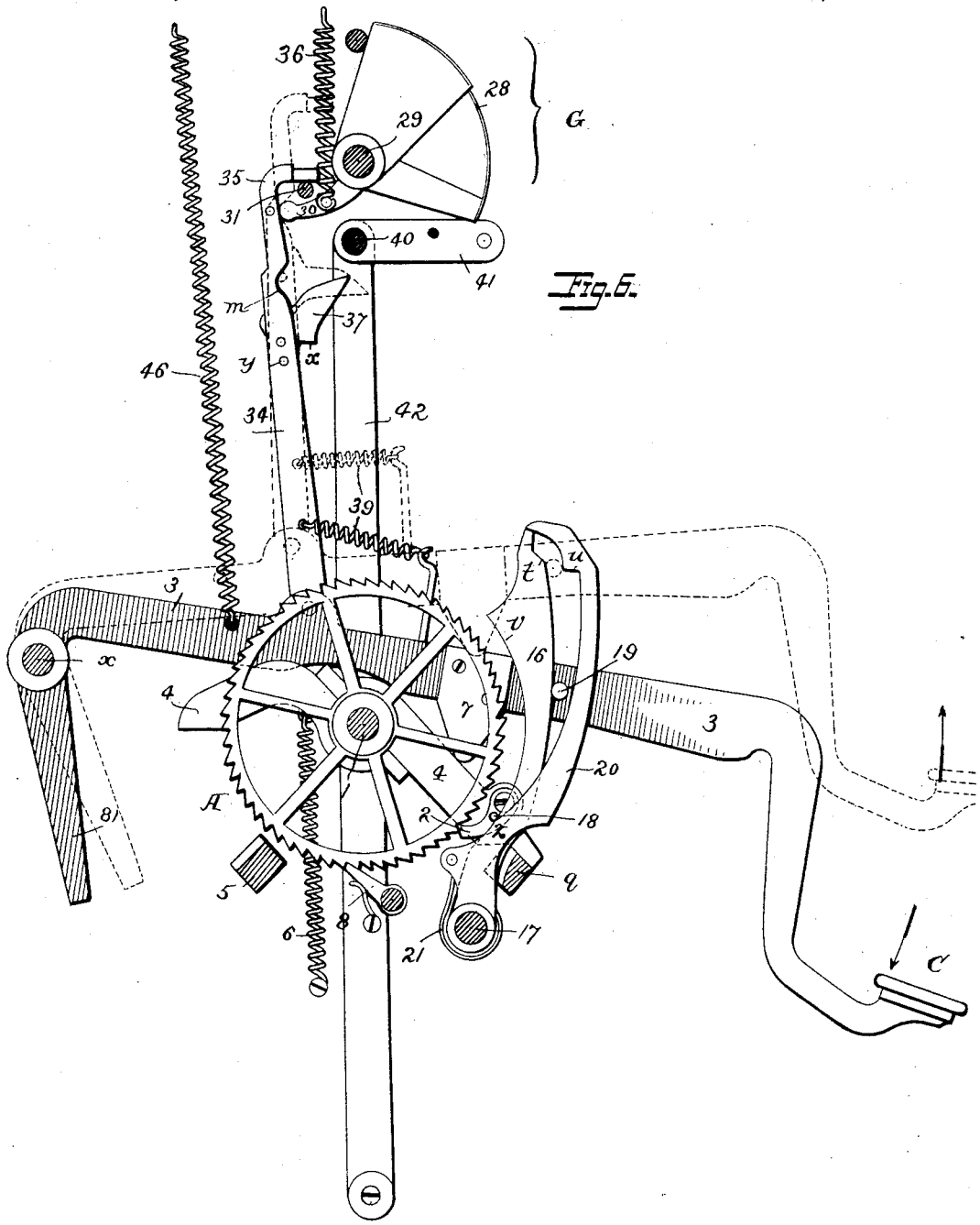
Figure 7:
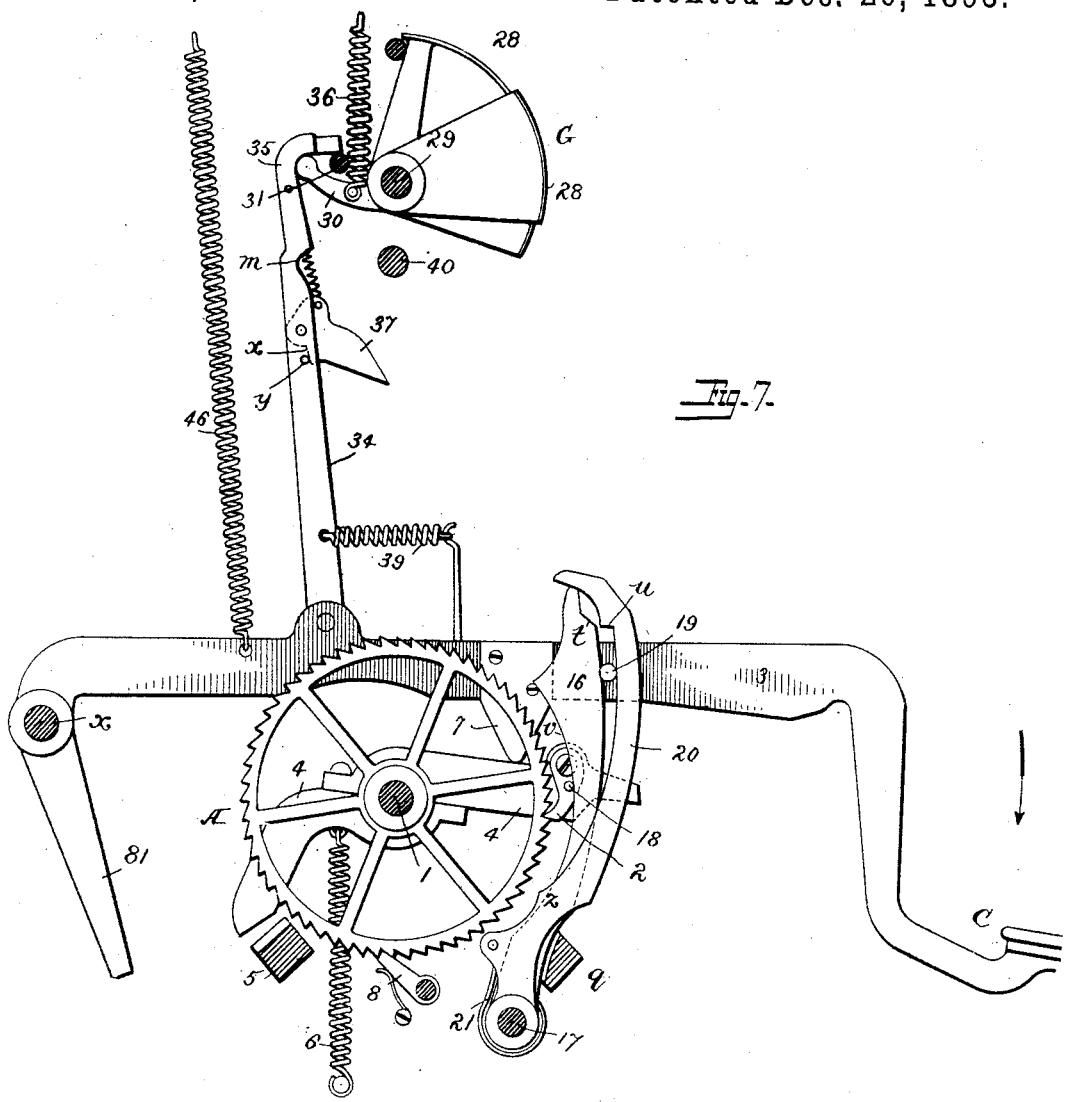
Figure 8:
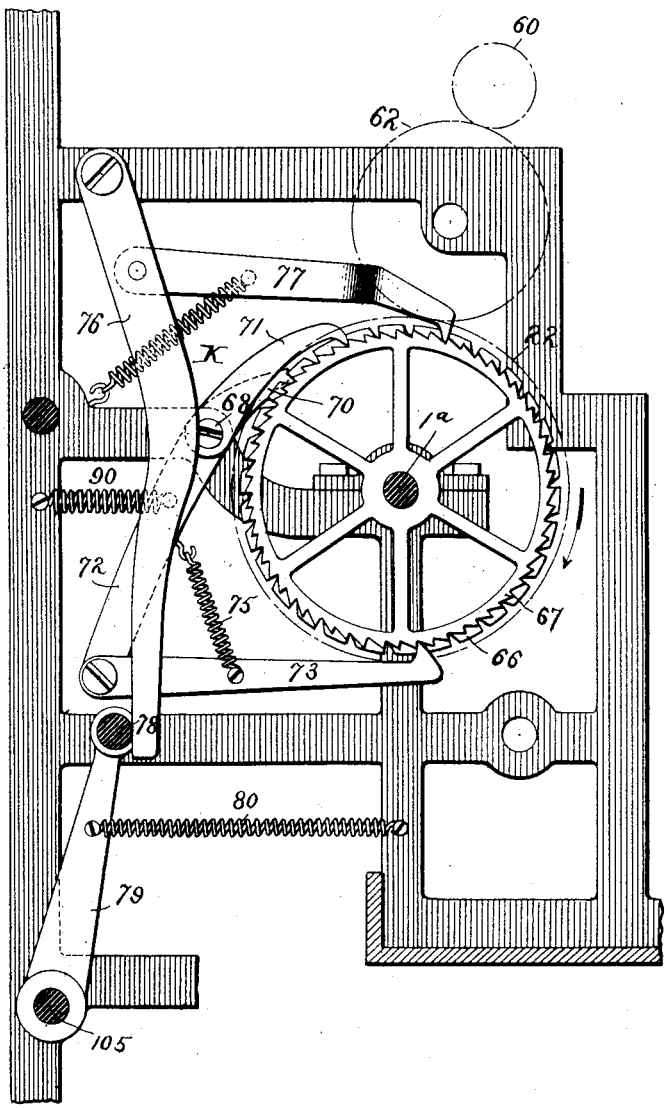
Figure 13:
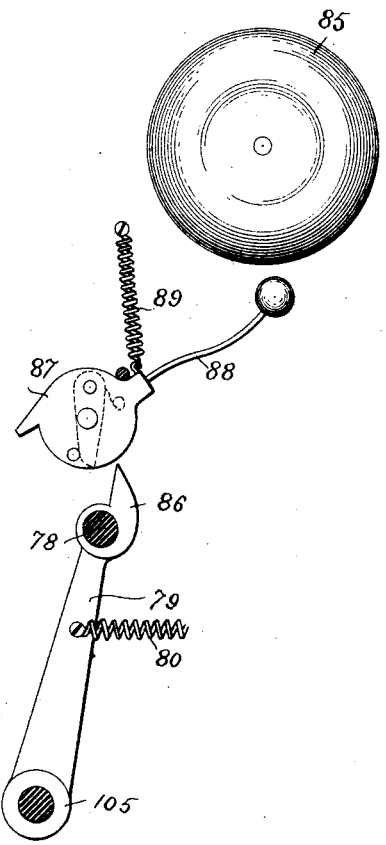
Figure 9:
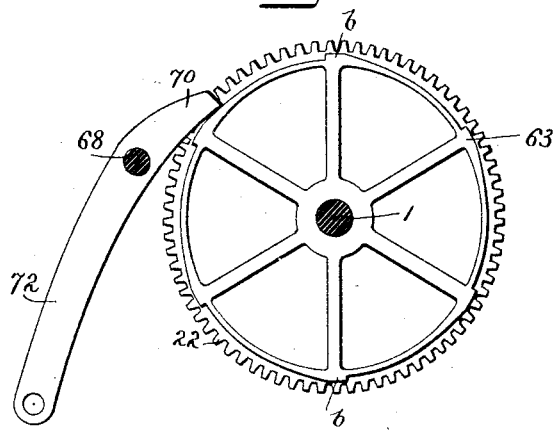
Figure 10:
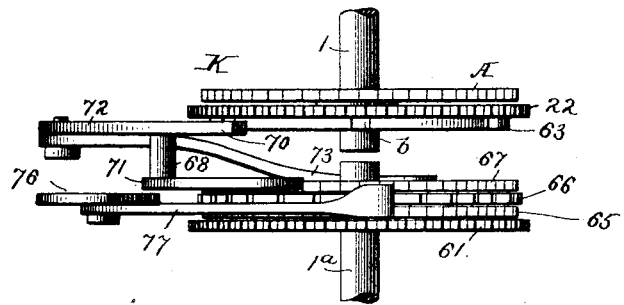
Figure 11:
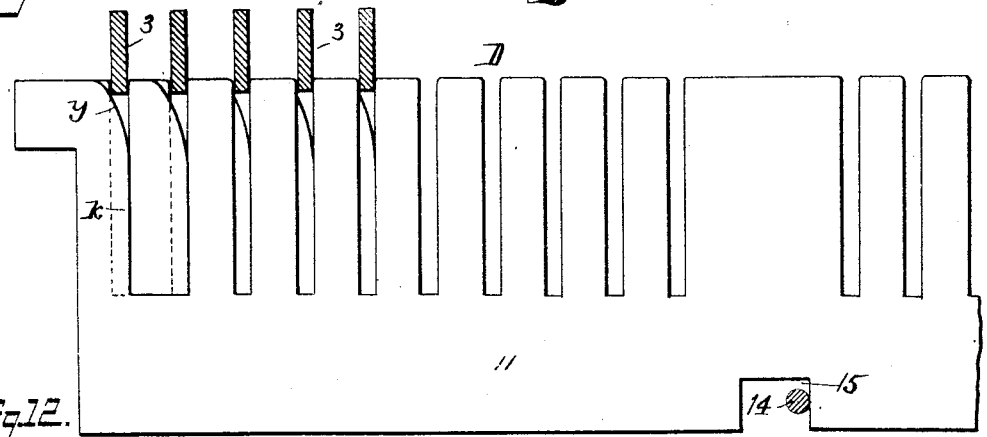
Figure 12:
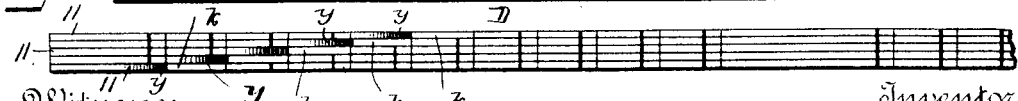

In the accompanying drawings Figure 1 is a front elevation of our improved register within its casing. Fig. 2 is a transverse sectional elevation on the line 2—2, Fig. 3. Fig. 3 is a front elevation showing a limited number of keys and parts connected therewith, the inclosing case being removed. Fig. 4 is a plan of the parts shown in Fig. 3. Fig. 5 is a detached view illustrating the keys, tablets, intermediate mechanism, and check device. Fig. 6 is a view showing the parts illustrated in Fig. 5, except the check device, in another position. Fig. 7 is a view showing some of the parts illustrated in Fig. 5, in a different position. Fig. 8 is a view illustrating the transfer mechanism between the two shafts of the two sections of the machine. Fig. 9 is a detached view of parts of the transfer mechanism. Fig. 10 is a plan of the parts illustrated in Fig. 8. Fig. 11 is a detached view illustrating the key lever locking device. Fig. 12 is a plan of the parts shown in Fig. 11. Fig. 13 is a sectional elevation of the audible alarm and the means for operating it. Fig. 14 is a detail view of the tablet operating mechanism. Fig. 15 is a rear elevation of the left hand end of the machine, with some of the pendent arms of the bell-crank key levers broken away to expose the ends of the pawl-carrying levers and the graduated stop bar co-operating therewith.

The same letters and numerals of reference are used to indicate identical parts in all the figures.

In the present instance the machine is shown as provided with two sets or banks of keys, Fig. 1, that on the right containing nineteen keys representing multiples of five from 5 to 95 inclusive, and adapted to register amounts less than one dollar, and that on the left containing ten keys representing multiples of one from 1 to 10 inclusive, and adapted to register dollars. The two sets of keys co-operate with separate registering wheels, and by means of suitable transfer devices hereinafter described the amounts added upon the cents-registering wheel are transferred at suitable intervals to the dollars-registering wheel, so that the total amount registered upon the machine may be read from the registering wheels in numerical order at any time. The mechanisms co-operating with the two sets of keys are quite similar, and we will confine ourselves to a description of that co-operating with the cents bank of keys, except where that co-operating with the other bank is specifically referred to. The operating keys C consist of levers 3, Figs. 2, 4, 5, 6 and 7, hung at their rear ends upon a fixed horizontal rod *x* supported at its opposite ends in the side frames of the machine. The front ends of the alternate levers are extended and bent downward, so that the numbered finger buttons will rest in two horizontal rows, one above the other, as is usual. The rear ends of the levers 3 are provided with integral pendent arms 81 below their fulcrum shaft *x*, the levers 3 and arms 81 forming bell-cranks of the operating keys, for a purpose hereinafter explained. Extending transversely beneath the cents bank of keys and journaled at or near its opposite ends in suitable bearings upon the framework is a horizontal rotary shaft 1 having fast upon it a series of toothed wheels A, one for and located beside each key lever. Loosely hung upon the shaft 1, one beside each wheel A, is a series of pawl-carrying levers 4, each having pivoted to its forward end a pawl 2 adapted to co-operate with its corresponding wheel A. The rear ends of these levers 4 are adapted to rest and be yieldingly held against a series of graduated stops 5 by springs 6 connected to said levers in rear of the shaft 1. The purpose of the stops 5 is to normally hold the front ends of the levers and their actuating pawls in different horizontal planes, and to that end said stops may be arranged and supported in any suitable manner. In the present instance they are formed upon or of a continuous bar curved in a spiral direction partially around the shaft 1. The key levers have uniform strokes and each has secured to it a pendent plate or finger 7 adapted when the front end of the lever is depressed to contact with the front end of the particular pawl-lever 4 which stands below it and to carry said lever and its pawl downward until the lever and the key are both arrested by contact of the front end of the pawl-lever with a suitable stop $q$. The pawl 2, by the means hereinafter described, is engaged with its corresponding toothed wheel A at the beginning of movement of the key lever, so that during the downward movement of the pawl it carries the wheel A with it and turns the shaft 1. The key levers 3 are located in the same horizontal plane and their plates 7 are of the same length, so that, owing to the different horizontal planes in which the front ends of the pawl-levers 4 lie, as before explained, the full downward strokes of the different key levers will turn the shaft 1 different distances, and the adjustment of the parts is such that the key of lowest value, as the five-cent key, will turn the shaft one unit of distance, the next higher key two units, and so on to the last key in the cents bank, which will turn the shaft nineteen units of distance. Spring-pressed pawls 8 engaging the toothed wheels A prevent any retrograde movement of the shaft 1.

The actuating pawls 2 are normally disengaged from the wheels A, as seen in Fig. 5, being held in disengaged position by their own gravity or by the action of suitable springs, so that whenever any one of the key levers is depressed and its co-operating pawl caused to turn the shaft the wheels A in turning with the shaft will not have to ride over their co-operating pawls, but turn free of them. The means for engaging a given pawl with its co-operating wheel A at the beginning of movement of its operating key may be now described as follows, reference being had to Figs. 5, 6 and 7. Hung at their lower ends upon a horizontal rod 17 is a series of upwardly extending arms 16 whose rear edges $v$ are curved in the arc of a circle concentric to the shaft 1 and whose front edges are curved in the arc of a circle concentric to the fulcrum shaft of the key levers. There is one of these arms 16 opposite the front end of each pawl-carrying lever 4, and each pawl is provided with a laterally projecting stud or pin 18 resting against the rear edge $v$ of the arm 16 beside it. It results from this that whenever an arm 16 is thrown rearward the pawl 2 will be engaged with the toothed wheel A. Each arm 16 is provided at the upper end of its forward edge with a rounded shoulder $t$ against which rests a pin 19 upon the adjacent key lever when the latter is in its normal upper position, and whenever the front end of the key lever is depressed its pin 19 will ride over the shoulder $t$ and throw the arm 16 rearward and carry the pawl into engagement with the wheel A, and the pin 19 will continue to bear against the curved forward edge of the arm 16 during the downward stroke of the key lever and thereby hold the pawl in engagement with the wheel. The arm 16 will continue to hold the pawl in engagement with the wheel, and the front end of the pawl-lever in its depressed position, during the return upward movement of the key lever, until the pin 19 passes above the shoulder $t$, whereupon the arm 16 is free to swing forward and release the pawl and permit the spring 6 connected to the pawl-lever to return the lever and pawl to normal position. This locking of the pawl in engagement with the wheel at the beginning of its downward movement by means of the curved arm 16 and co-operating pin 19 upon the key lever serves to prevent any excessive movement of the wheel A and shaft 1 by reason of their own momentum, since it will be impossible for them to move any farther than does the actuated pawl-lever 4 and its pawl, and these are moved only the exact distance necessary to register the value of the operated key.

For the purpose of compelling full strokes of the operated keys and preventing return of them to normal position, after being once started, until they are given their full downward strokes, there is provided a series of locking arms 20 also hung at their lower ends upon the shaft 17, one beside each arm 16 and adapted to co-operate with the same pin 19 upon the adjacent key lever. A spring 21 coiled around the rod 17 and bearing at one end against the arm 16 and at its other against the arm 20 presses the arm 16 forward and the arm 20 rearward and thereby yieldingly holds both of them in engagement with the pin 19 upon the key lever. Each arm 20 is provided near the upper end of its rear edge with a locking shoulder $u$ which catches over the pin 19 upon the key lever as soon as said pin is carried below the shoulder and thereby locks the key lever from return upward movement. Near the lower end of its rear edge the arm 20 is provided with a cam shoulder $z$ adapted to be engaged by the pin 18 upon the pawl 2 just as the latter reaches the end of its downward stroke, whereby at the end of such downward stroke of the pawl and operating key the locking arm 20 will be thrown forward and its shoulder $u$ carried out of the path of the return movement of the pin 19, as seen in Fig. 6. The engagement of the pin 19 with the forward edge of the arm 16 will hold the pawl 2 locked in engagement with the wheel A and consequently maintain the pawl-lever 4 in its depressed position against the stress of its spring 6 until the key lever is returned to its normal position and its pin 19 carried above the shoulder $t$ of the arm 16 and the latter permitted to be thrown forward by the spring 21 and the pawl released, whereupon the spring 6 will return the pawl lever and pawl to normal position. The engagement of the pin 18 upon the pawl with the shoulder $z$ upon the locking arm 20 will therefore maintain said arm 20 out of locking position until the pin 19 of the key lever has cleared the locking shoulder $u$ and reached normal position, whereupon at the return upward movement of the pawl-lever and pawl the arm 20 will be released and thrown rearward to normal position by the spring 21, ready to catch over the pin 19 and lock the key lever from return upward movement the next time it is depressed.

It will be understood that, so far as its co-operation with the locking arm 20 is concerned, the pin 18 might be located upon or consist of any suitable projection from the pawl-lever 4, instead of being located upon the pawl 2.

The operating key levers are yieldingly held in and returned to normal position by springs 46 secured at their upper ends to the framework and connected at their lower ends to the levers in front of their fulcrum shaft $x$.

Having now described the means for actuating the registering mechanism, that mechanism itself may be next described, reference being had to Figs. 2, 3, 4, 8, 9 and 10. The rotary shaft 1 has fast upon its extreme left hand end a gear wheel 22 which meshes with a wheel 23, Fig. 2, fast upon the side of a larger wheel 24, which latter meshes with a pinion 25 fast upon the side of the primary wheel of the cents register J, Fig. 3. The toothed wheels A' of the dollar side of the machine, which correspond to the toothed wheels A upon the cent side of the machine, are fast upon a rotary shaft $1^a$ in line with the shaft 1, Figs. 3, 8 and 10. The shaft $1^a$ has fast upon it near its right hand end a gear wheel 61 which meshes with a second wheel 62 which in turn meshes with a pinion 60 fast upon the primary wheel of the dollar register I, Fig. 3. Also fast upon the shaft $1^a$ beside the gear 61, Fig. 10, is a toothed wheel 65 having sixty teeth, while loose upon said shaft between the wheel 65 and the end of the shaft are two wheels 66 67, Figs. 8 and 10, fastened together so as to turn in unison, the wheel 67 having sixty notches or teeth, and the wheel 66 having thirty notches and being slightly larger in diameter than the two wheels 65 67 between which it lies. Pivoted to the framework at 68, Figs. 2 and 8, is a lever 70—72, whose upper arm 70 rests upon the periphery of a cam ring 63, Fig. 2, fast upon the side of the gear wheel 22 on the shaft 1 and provided with six equidistant cam projections $b$. The arm 72 of said lever has pivoted to its lower end the rear end of a hook pawl 73, Fig. 8, whose front end is curved to the left to underlie and engage the wheels 66 67, Fig. 10. A spring 90, Fig. 8, connected to the pendent arm 72 of the lever 70—72 pulls its lower end rearward and presses its upper end against the cam ring 63. Fast upon the same hub or sleeve which supports the lever 70—72 at 68, Fig. 10, is an arm 71 whose upper end engages the notches in the wheel 67, Figs. 8 and 10. Pivoted at its upper end to the framework, Fig. 8, is a pendent arm 76 having pivoted to it the rear end of a pawl 77 whose widened front end overlies and rests upon the three wheels 65 66 67, Fig. 10. A coiled spring connected to the pawl 77 and to the framework yieldingly pulls the arm 76 and pawl 77 rearward, holding the lower end of the arm 76 against the cross rod 78 of a swinging frame 79 fast upon a rock-shaft 105 and composed of two side arms and the cross rod 78 connecting their upper ends. A spring 80 connected to the frame 79 tends to swing it forward, and it is held from movement under the stress of said spring by engagement of the rod 78 with the lower ends of the arms 81 of the bell-crank key-levers, Fig. 2. It results from this that whenever any key lever is depressed the frame 79 will be swung rearward and the arm 76 and pawl 77 permitted to move rearward under the influence of the spring connected to said pawl.

The mode of operation of the parts above described is as follows: Every time one of the key levers is depressed and the frame 79 swung rearward the arm 76 and pawl 77 will be moved rearward, and when the key lever is released and re-set the spring 80 will pull the arm 79 forward again and return the arm 76 and pawl 77 to initial position. This rearward movement of the pawl 77 is sufficient to carry its forward end backward over one tooth of the ratchet wheels 65 and 67, but not sufficient to carry it backward from one notch to another of the intermediate wheel 66, and inasmuch as the latter wheel is of larger diameter than the other two it results that when the wheels are in the position shown in Fig. 8 the pawl 77 will move idly backward and forward at each operation of the machine, without turning the wheels 65 67, the pawl simply riding up over the smooth periphery of the wheel 66, between two of its notches, each time it is drawn rearward, and then moving forward and dropping into the same notch in said wheel and the wheels 65 67 with which it had been before engaged. If, however, the wheel 66 be turned forward the distance of one tooth or notch of the wheels 65 67, so that the end of the pawl 77 will rest upon the middle of the smooth space between two of the notches of the wheel 66, then when the pawl is moved rearward by the operation of a key it will drop into the next succeeding notch of the wheel 66 and consequently into the next succeeding notches of the wheels 65 67, so that when the pawl is then moved forward to initial position it will turn forward all of said wheels the distance of one notch or tooth of the wheels 65 67, and inasmuch as the wheel 65 is fast upon the dollar registering shaft $1^a$ such movement of the wheel 65 will be transmitted to the dollar register I, and one dollar be added upon its primary wheel, the adjustment of the parts being such that one-sixtieth of a revolution of the shaft $1^a$ will impart sufficient movement to the primary registering wheel of the dollar series to add one unit upon it.

It having now been described how the pawl 77 actuates the dollar register when the parts have been properly set for it, we will next describe the operation of setting the parts for such movement. As before stated the upper end of the lever 70—72 rests upon the periphery of the cam ring 63 which is fast upon the side of the gear wheel 22 and consequently fast upon the cents registering shaft 1. The toothed wheels A upon said shaft each have one hundred and twenty teeth, and the adjustment of the parts and gearing of the shaft to the cents register are such that one one-hundred-and-twentieth of a revolution of the shaft 1 will cause a unit to be added upon the primary wheel of the cents register I. As before stated the cam ring 63 is provided with six equidistant cam projections $b$, so that at each sixth of a revolution one of said cam projections will ride under and vibrate the lever 70—72, and as each sixth of a revolution of the shaft 1 causes twenty units (in this instance twenty fives, or one dollar), to be added upon the cents registering wheels, the lever 70—72 will be vibrated each time the sum of one dollar is registered upon said wheels. When the upper end of said lever is moved upward and rearward by one of the cam projections its lower end is thrown forward and the hook pawl 73, Fig. 8, moved over one tooth of the wheel 67 and engaged with a new notch thereof, and when the cam projection $b$ clears the end of the lever 70—72 and the spring 90 throws its lower end and the pawl 73 rearward the latter will turn the wheel 67 forward the distance of one tooth or notch, and will consequently turn the wheel 66 with it half the distance between two of the notches in said wheel 66, so that the notch in said wheel with which the pawl 77 had been engaged will be carried away from said pawl and the latter will rest upon the smooth space between said notch and the next succeeding notch in said wheel, thus setting the parts to effect a transfer to the dollar register at the next succeeding operation of the machine in the manner heretofore explained.

If two keys could be depressed at the same time the movement imparted to the shaft 1 would be only that derived from the pawl having the most extended throw, so that the shaft would not be turned as is desired, to an extent equal to the sum of the movements resulting from the separate action of the keys. To prevent this result we combine with the keys or any of the connected instrumentalities suitable locking devices D, Figs. 2, 11 and 12. These may be formed in different ways well known to those skilled in the art. We prefer, however, to make the lock in the form of a series of adjacent plates 11, one to each key. Each plate 11 is guided to slide longitudinally below all the levers 3 and the various plates are slotted vertically, and in each plate the slots are arranged so as to be directly below the levers, except one slot $k$ in each plate, which is not below but at one side of the levers and has an inclined edge $y$ which is struck when the lever above is depressed so that that plate is thereby slid longitudinally to carry the other slots from under the remaining levers until the depressed lever is elevated. The various plates have the slots so arranged that the slots $k$ of the different plates are below different levers, so that no lever can be depressed without striking and sliding one plate and thereby locking all the other levers, but when a lever is raised a spring 12 returns the shifted plate to its normal position.

The spring 12 acts on an arm B Figs. 2 and 3 carrying a bar 14 Fig. 11 that bears on shoulders 15 of all of the plates, and is swung to one side to place the spring under tension whenever any one plate is moved.

It will be seen that but one key can be depressed at a time as the movement of one key carries the plate across the path of all the other keys.

Having now described the registering mechanism and key-locking devices of our new machine, we will next proceed to describe its indicating mechanism, as follows: The frame F of the machine is suitably constructed to support the various parts already described, and also a series of indicators G and to inclose a cash receptacle Y which may be in the form of a drawer but as shown is preferably a stationary receptacle with a movable flexible cover 125 which slides in guides as an ordinary desk cover and closes or uncovers an opening at the front of the receptacle. The position of the drawer cover or any part thereof is made the means of displaying the indicators as described hereinafter. Each indicator is also controlled through any suitable connections by the movement of one of the keys and preferably so as to be set to its concealed position by the action of the key, the covering of the receptacle causing the display of the indicator. While the indicators may be of any usual or suitable construction, as sliding or hinged tablets, &c., we prefer to make each in the form of a curved plate or tablet 28, hung to swing upon a shaft 29, common to all the indicators, and to reduce the space occupied by the indicators and permit each tablet to be made as large as possible we prefer to pivot the tablets to the shaft in sets of two or more, one tablet being slightly smaller than the other, being opposite the same part of the shaft, so that one tablet will swing up and down outside of the other and both will swing opposite the same sight hole or opening $r$ in the case H which incloses the mechanism. See Figs. 1, 2 and 6. The outer tablet each pair is only about half the length of the inner one and the depending lower half of the latter, which stands opposite the sight opening when the indicator is in normal non-indicating position, is blank, the indicating number being placed upon the upper half of the tablet where it is normally covered by the outer tablet.

Each indicator is provided with a rearwardly projecting finger 30 having connected to it a coiled spring 36 tending to lift the finger and throw the indicator downward to indicating position. A rod 31 hung by side arms 32 to the framework of the machine and free to be moved vertically, Figs. 2, 5, 6, 7 and 15, extends transversely across the rear sides of the indicators above their fingers 30, springs 33 connected to the side arms 32 yieldingly holding the latter and the rod 31 in their upper normal position. When any one of the indicators is released from its detaining means, hereinafter described, its spring 36 will pull its finger 30 upward against the rod 31 and throw its tablet downward to indicating position; and when the rod 31 is moved downward by the means hereinafter described it will re-set such indicator, and any others that may have been released and moved by their springs, to normal non-indicating position.

Pivoted at their lower ends to the key-levers 3 is a series of vertically extending indicator rods, one for each key-lever and indicator. These rods are bent forward at their upper ends to form hooks or fingers 35, which, when the key-levers are depressed and the rods 34 carried down with them, engage the rod 31 and pull it downward to re-set any exposed indicators, as before explained. The rods 34 are also provided upon their front edges a short distance below their upper ends with notches $m$ which co-operate with the rounded rear ends of the indicator fingers 30. The rods 34 are pulled forward by springs 39 connected to hooks upon the key-levers 3, and when the indicators are in normal position the engagement of the fingers 30 with the notches $m$ in the rods holds the indicators from movement by their springs 36. When the upper end of any rod is pushed rearward, against the stress of its spring 39, its notch will be disengaged from the finger 30 of its co-operating indicator and the latter will be released and thrown into indicating position by its spring 36, its finger 30 moving upward into contact with the rod 31. One of the supporting side-arms 32 of the rod 31 is provided with a pendent arm 170, Fig. 2, whose rear edge has formed in it a notch adapted to co-operate with a pin 171 upon the side of a bent arm 172 loosely hung at its upper end to the framework. A coiled spring, Fig. 14, connected to the arm 172 pulls it forward with its pin 171 bearing against the arm 170. When the rod 31 is pulled downward by the depression of one of the key-levers the pin 171 will enter the notch in the arm 170, Fig. 14, and hold the rod 31 in depressed position, after the key-lever has been released, until the arm 172 is swung rearward and the pin disengaged from the notch, whereupon the rod 31 will be released and pulled upward to normal position by the spring 33. The forwardly bent lower end of the arm 172 projects into the path of a vertically movable rod 40 extending transversely across the machine and hung by side arms 41 to the framework, a coiled spring connected to one of the arms 41, Fig. 5, serving to hold the rod in its normal upper position. When this rod is depressed, by means hereinafter described, it will bear against the beveled or rounded end of the arm 172 and force the same rearward and release the rod 31.

Under the construction and arrangement of parts so far described when any rod 34 is pulled downward by the depression of its key lever its hook 35 will pull down the rod 31 and re-set any exposed indicators, while its notch $m$ will be carried below the finger 30 of its co operating indicator, Fig. 6, the surface of the rod above its notch sliding over the rounded rear end of such finger as the rod moves downward. When the operating key is released and returned to its upper normal position its rod 34 will slide upward over the rear end of the finger 30 of its indicator and the latter be re-engaged by the notch $m$ in the rod. Now when the rod 31 is released in the manner heretofore described all of the indicators will be retained in their normal non-indicating position by the engagement of their fingers 30 with the notches $m$ of their co-operating rods 34, as before explained, so that it only remains to move the rod 34 of the operated key slightly rearward to release its indicator and permit its spring to throw it into indicating position, and the means for so moving the rod may now be described. Each rod 34 has pivoted to its side a short distance below its notch $m$ a forwardly projecting trip 37 having connected to it a coiled spring, Figs. 5 and 7, tending to move the trip to and maintain it in substantially horizontal position. A shoulder $x$ upon the under side of the trip is adapted to contact with a pin $y$ upon the side of the rod 34 when the trip is thrown below a horizontal position, Fig. 7. When the rods 34 are in their upper normal position the trips 37 rest upon and bear against the transverse rod 40 before described, Figs. 2 and 5. When any rod is pulled downward by the depression of its key lever its trip will yield and ride over the rod 40 and when it clears it will spring forward to approximately horizontal position. When the key lever is released and the rod 34 returned to normal position the trip 37 will contact with the rod and yield upon its pivot, being moved farther downward and bringing its shoulder $x$ against or in close proximity to the pin $y$ upon the rod. If the rod 40 be now depressed it will ride over the end of the trip and force the rod rearward and thereby release the indicator corresponding thereto and permit its spring 36 to throw it into indicating position. When the rod 40 clears the trip 37 the latter will spring upward to normal position and the rod 34 will be pulled forward by its spring 39, and when the rod 40 is lifted to normal position it will engage and bear against the under side of the trip as in Figs. 2 and 5.

It will thus be seen that the operation of any one of the key levers simply sets or prepares the parts for the display of the corresponding indicator, which latter remains hidden until exposed by the operation of an independent device—in this instance the rod 40. This rod is operated by the money drawer and it may be connected with the drawer itself or with any moving part of the money receptacle for that purpose. In the present instance, as seen in Figs. 2, 3, 5 and 6, a bar 42 connected at its upper end to one of the side arms 41 of the rod 40 depends at its lower end into the drawer compartment and is provided with an anti-friction roller standing in the path of a cam $n$ upon one side of the movable lid or cover of the money receptacle. When said cover is moved rearward to open the drawer the cam $n$ rides over the roller upon the pendent bar 42 and forces it downward, thereby pulling the rod 40 downward, with the result before explained. When the cover is pulled forward to close the drawer the rod 40 will be released and lifted to normal position by its spring. The first downward movement of the rod 40, at the opening of the drawer, presses the arm 172 rearward to release the rod 31 in the manner heretofore described, while the farther downward movement of said rod pushes the rod 34 of the operated key rearward and releases the corresponding indicator in the manner just explained.

As the depression of each key carries the trip 37 connected with such key below the bar 40, and in itself does not act to display the tablet, it is possible to display at one time upon the indicators the sum of several keys, so as to display a higher amount than is indicated by the highest indicator. Supposing for instance the highest indicator will display ten dollars and the payment of a customer amounts to eighteen dollars, the salesman depresses the ten, five, and three dollar keys in succession without unclosing the cash receptacle, and after the keys have been thus moved he uncloses the receptacle. The bar 40 will then act on the dogs 37 of the three keys depressed to throw back their detents 34 and release the corresponding indicators 10, 5, 3, which expose said numbers opposite the sight opening, their sum indicating the amount of the sale, eighteen dollars. At the same time the respective movements of the keys are separately imparted to the wheels A and to the totalizing register or counter, heretofore described, and by reason of this indirect connection between the key levers and their respective indicators, the number of key levers, indicators, and their operative connections, can be reduced to the minimum as combinations of keys may be struck to indicate or to indicate and register any desired amount, thus obviating the necessity of having a key for each amount the machine should be capacitated to indicate or indicate and register; the construction being such that when two or more keys are struck in succession, to form a combined indication, the second and following keys operated will have no effect upon the indicator co-acting with the first key, nor the third upon the first and second.

As it is desirable to indicate each sale by an audible alarm we place a bell 85 in any suitable position and ring it from any moving part of the machine as for instance through the medium of a lug 86 on a swinging frame 79 engaging a spring dog 87 on the hub of a bell hammer 88, to which is connected a spring 89 for drawing the hammer to the bell when the lug escapes the dog.

It will be understood from the foregoing description that the indicating mechanism of our machine embodies a mode of operation which is radically new and wholly different from that of machines of this character heretofore in use. In such machines the indicator has generally been displayed directly by the operation of the operating key or handle, whereas in our new machine the operation of a key simply sets or locates its corresponding indicator for movement to indicating position, and the indicator is then displayed by the operation of an independent device, in this instance a money drawer or its movable cover. This new mode of operation, under which the indicators are first set for display, and then displayed by means independent of the setting means, constitutes one of the important features of our invention.

All the keys may be locked at any time by locking the locking plates. This is done by a bolt 50 of a lock thrown into position to prevent the vibration of the arm B, Figs. 1 and 11. The lock is secured to the case of the machine and is moved by a key inserted through the key-hole 51, Fig. 1.

In order to lock the receptacle Y yet unlock it whenever a key is depressed we combine with the lock and keys C such connections as will effect the desired result. Thus a catch 130, Fig. 2, engages a shoulder of the cover 125 under the action of a spring 131 arranged to swing to either side of the fulcrum of the catch and to hold it in position in which it is set. A rod 132 connected with an arm of the catch has a slot 133 to receive a pin 134 on an arm 135 on the shaft 105 of the frame 79, so that when a key is depressed and the frame 79 swung rearward the rod 132 will be thrown forward and the catch disengaged from the cover, the spring 131 then holding it out of engagement.

When the cover 125 is closed its lower edge strikes a finger 138 of the catch and swings it until the spring bearing crosses the fulcrum when the spring will react and throw the catch into engagement with the shoulder of the cover.

In some cases it is desirable to furnish each customer with a printed ticket that will indicate the amount of the purchase and which is taken to the cashier who receives the payment. We provide for this by providing the machine with reels T supporting a series of paper strips or tapes V, one to each key, and each strip is carried forward below the key and through a slot $p$ in the case, and with these features we construct a suitable feeder for feeding the strip at each completed movement of the key and a cutter for severing it at each completed movement. The feeder and cutter may be differently constructed. Thus the feeder may consist of two cylinders or rollers S S' between which the strip passes and one or both of which are turned to a limited extent by the depression of the key. In the construction shown a rack bar 91 in position to be struck by the lever 3 gears with a pinion 92 turning at the side of one of the rollers, and carrying a pawl engaging with the teeth of a ratchet 93 on the roller when the rack is depressed and sliding over the teeth when the rack bar rises and thereby feeding a section of the strip through the slot as the key is moved backward. The cutter is a sharp edged plate 94 supported in position to be struck by the key as it completes its downward movement, to be thereby depressed across the slot $p$ cutting the paper against a cutting strip 96, a spring 97 lifting the cutter as the lever 3 rises. The rolls may be constructed to act as printing or embossing rolls to mark each section of the strip with a number corresponding to that on the operating key. Thus the roll 93 may be provided with embossing pins arranged to make perforations or indentations in the paper to represent the desired figure. To avoid the expense of embossing or printing rollers we prefer to emboss or print the separate strips with succeeding numbers corresponding to the key with which the strip is used, the sections of the strip being further numbered consecutively to indicate the number of each check given out as shown by the deflected strip V', Fig. 5.

It will be evident that the detents or retainers for holding and releasing the indicators may be constructed in different ways and may be actuated from any other source than the moving part of the receptacle, as from a finger key or lever, so as to expose the indicators after one or more keys have been depressed and released.

What we claim is—

1. In a registering mechanism, the combination of a rotary shaft, a series of toothed wheels fast thereon, a series of pawl-carrying arms or levers loose upon said shaft, one beside each toothed wheel and carrying a pawl co-operating therewith, a series of graduated stops co-operating with said pawl-carrying arms to regulate their degrees of movement, and a series of keys for moving the pawl-arms substantially as described.

2. In a registering mechanism, the combination of a rotary shaft, a series of toothed wheels fast thereon, a series of pawl-carrying arms or levers loose upon said shaft, one beside each toothed wheel and carrying a pawl co-operating therewith, a series of graduated stops against which the arms normally rest in different positions, and a stop for arresting all of the arms at the same point at the opposite end of their movement, substantially as described.

3. In a registering mechanism, the combination of a rotary shaft, a series of toothed wheels fast thereon, a series of pawl-carrying arms or levers loose upon the shaft, one beside each toothed wheel and carrying a pawl co-operating therewith, said arms normally resting in different positions, and a series of keys having uniform strokes and arranged to engage the pawl-carrying arms at different points in their strokes to impart different degrees of movement to the rotary shaft, substantially as described.

4. In a registering mechanism, the combination of a rotary shaft geared to the primary registering wheel, a series of toothed wheels fast upon the shaft, a series of pawl-carrying arms or levers loose upon the shaft, one beside each wheel and carrying a pawl co-operating therewith, a series of graduated stops, a series of springs for holding the pawl-carrying arms in normal position against said stops, a series of keys for actuating the pawl-carrying arms, and a fixed stop for limiting the movement of the arms under the operations of the keys, substantially as described.

5. In a registering mechanism, the combination of a toothed wheel, a pawl-carrier hung upon the axis of said wheel and carrying a pawl co-operating therewith, and a movable arm having a curved edge approximately concentric to the axis of the wheel and co-operating with the pawl to lock it in engagement with the wheel during its registering stroke, substantially as described.

6. In a registering mechanism, the combination of a toothed wheel, a pawl-carrier hung upon the axis of said wheel and carrying a pawl co-operating therewith, a movable arm having an edge curved approximately concentric to the axis of the wheel and co-operating with the pawl to hold it in engagement with the wheel during its registering stroke, and a reciprocating actuating device for the pawl co-operating with the movable arm to move it into and maintain it in operative position during the registering stroke of the pawl, substantially as described.

7. In a registering mechanism, the combination of a toothed wheel, a pawl-carrier hung upon the axis of said wheel and carrying a pawl co-operating therewith, a pivoted operating key for actuating the pawl-carrier, and a movable arm having its inner edge curved in the arc of a circle approximately concentric to the axis of the wheel and adapted to co-operate with the pawl to hold it in engagement with the wheel during its registering stroke, and having its outer edge curved in the arc of a circle approximately concentric to the fulcrum of the key and co-operating with a projection upon the key, substantially as described.

8. In a registering mechanism, the combination of a toothed wheel, a pawl-carrier hung upon the axis of said wheel and carrying a pawl co-operating therewith, a pivoted operating key for actuating the pawl-carrier, and a movable arm having its inner edge curved in the arc of a circle approximately concentric to the axis of the wheel and adapted to co-operate with the pawl to hold it in engagement with the wheel during its registering stroke, and having its outer edge curved in the arc of a circle approximately concentric to the fulcrum of the key and provided at one end with an offset or shoulder which stands in the path of a projection upon the key when the latter is in its normal position, said projection engaging said shoulder at the beginning of movement of the key, to throw the arm into operative position, and then moving over its curved outer edge to hold it in such position during the further stroke of the key, substantially as described.

9. In a registering mechanism, the combination of a toothed wheel, a pawl-carrier hung upon the axis of the wheel and carrying a pawl co-operating therewith, a pivoted key for actuating the pawl-carrier, a movable arm having its inner edge curved in the arc of a circle approximately concentric to the axis of the wheel and adapted to co-operate with the pawl to hold it in engagement with the wheel, and a reciprocating part moved by or with the key and co-operating with the outer edge of the arm to move it into and maintain it in operative position, substantially as described.

10. In a registering mechanism, the combination of a toothed wheel, a pawl-carrier hung upon the axis of the wheel and carrying a pawl co-operating with it, a pivoted operating key for actuating the pawl-carrier, and a locking arm moving at the beginning of the stroke of the key into position to lock it from return movement, and thrown out of such locking position by the pawl-carrier at the end of the stroke of the latter, to permit the key to return to normal position, substantially as described.

11. In a registering mechanism, the combination of a toothed wheel, a pawl-carrier hung upon the axis of the wheel and co-operating with it, a pivoted operating key for actuating the pawl-carrier, said key being provided with a lateral projection or pin, and a locking arm normally resting at one end against the projection upon the key and provided with a locking shoulder adapted to catch over the projection when the key is moved and the projection carried below the shoulder, said arm being also adapted to co-operate with the pawl-carrier and be thrown out of locking position by the carrier at the end of the stroke of the latter, substantially as described.

12. In a registering mechanism, the combination of a toothed wheel, a pawl-carrier hung upon the axis of the wheel and co-operating with it, a pivoted operated key for actuating the pawl-carrier, said key being provided with a lateral projection or pin, a movable arm having one edge curved in the arc of a circle approximately concentric to the axis of the wheel and adapted to co-operate with the pawl to hold it in engagement with the wheel, and having its opposite edge curved in the arc of a circle approximately concentric to the axis of the key and adapted to be engaged by the pin upon the key, and a locking arm provided near one end with a locking shoulder adapted to catch over the pin upon the key at the beginning of movement of the latter, and co-operating with the pawl-carrier to be thrown out of locking position by the carrier at the end of the stroke of the latter, substantially as described.

13. In the transfer mechanism of a registering device, the combination of the cam wheel or ring 63 turning with the primary register and provided with the cams or projections $b$, the toothed wheel 65 turning with the secondary register, the wheels 66 and 67 turning together independently of the wheel 65 upon the same axis, the wheel 66 being of greater diameter than the wheels 65 and 67 and having a less number of notches, the reciprocating pawl 77 overlying and co-operating with the wheels 65 and 66, the lever 70—72 co-operating with the cam wheel 63, and the pawl 73 connected to said lever and co-operating with the wheel 67, substantially as described.

14. In the transfer mechanism of a registering device, the combination of the cam wheel or ring 63 turning with the primary register and provided with the cams or projections $b$, the toothed wheel 65 turning with the secondary register, the wheels 66 and 67 turning together independently of the wheel 65 upon the same axis, the wheel 66 being of greater diameter than the wheels 65 and 67 and having a less number of notches, the lever 70—72 co-operating with the cam-wheel 63, the pawl 73 connected to said lever and co-operating with the wheel 67, the swinging arm 76, the pawl 77 connected thereto and co-operating with the wheels 65 and 66, the swinging spring-pressed frame 79, and means for vibrating said frame at each operation of the machine, substantially as described.

15. In an indicating mechanism, the combination of an indicator normally resting in non-indicating position, an operating key or lever for setting or locating the indicator for movement to indicating position, and means operating independently of the key to display the indicator after it has been set or located by the key, substantially as described.

16. In an indicating mechanism, the combination of an indicator normally resting in non-indicating position, an operating key or lever for setting or locating the indicator for movement to indicating position, a money drawer or receptacle, and means intermediate a moving member thereof and the indicator for displaying the latter at the movement of such member after the indicator has been set by the key, substantially as described.

17. In an indicating mechanism, the combination of an indicator normally resting in non-indicating position, an operating key or lever for setting or locating the indicator for movement to indicating position, a fixed money drawer or receptacle having a movable cover or lid, and means intermediate such cover and the indicator for displaying the latter at the movement of the cover after the indicator has been set by the key, substantially as described.

18. In an indicating mechanism, the combination of an indicator normally resting in non-indicating position, an operating key or lever for setting or locating the indicator for movement to indicating position, a fixed money drawer or receptacle having a movable cover or lid, and means intermediate such cover and the indicator for displaying the latter at the opening movement of the cover after the indicator has been set by the key, substantially as described.

19. In an indicating mechanism, the combination of an indicator normally resting in non-indicating position but tending to move to indicating position, an operating key or lever for setting the indicator for movement to indicating position, and means independent of the key for releasing the indicator after it has been set and permitting it to move to indicating position, substantially as described.

20. In an indicating mechanism, the combination of an indicator normally resting in non-indicating position, a spring tending to move it to indicating position, means for holding it against movement by the spring, a key or lever for setting it for movement, and means operating independently of the key to permit the indicator to move to indicating position after it has been set, substantially as described.

21. In an indicating mechanism, the combination of an indicator normally resting in non-indicating position, a spring tending to move it to indicating position, means for holding it against movement by the spring, a key or lever for setting it for movement, a money drawer having a movable member, and means co-operating with such movable member to permit the indicator to move to indicating position after it has been set, substantially as described.

22. In an indicating mechanism, the combination of an indicator normally resting in non-indicating position, a spring tending to move it to indicating position, means for holding it against movement by the spring, a key or lever for setting it for movement, a fixed money-drawer having a movable cover, and means co-operating with such cover to permit the indicator to move to indicating position after it has been set, substantially as described.

23. In an indicating mechanism, the combination of a series of indicators normally resting in non-indicating position, means for locating or setting the respective indicators for movement to indicating position, and means operating independently of the setting means to display the respective indicators after they have been set or located, substantially as described.

24. In an indicating mechanism, the combination of a series of indicators normally resting in non-indicating position, means for locating or setting them for movement to indicating position, a money drawer, and means intermediate a moving member thereof and the indicators for displaying the latter after they have been located or set, substantially as described.

25. In an indicating mechanism, the combination of a series of indicators normally resting in non-indicating position, means for locating or setting them for movement to indicating position, a fixed money drawer having a movable cover, and means intermediate said cover and the indicators for displaying the latter after they have been located or set, substantially as described.

26. In an indicating mechanism, the combination of a series of indicators normally resting in non-indicating position, a series of keys for locating or setting them for movement to indicating position, and means operating independently of the keys to display the respective indicators after being so set or located by the keys, substantially as described.

27. In an indicating mechanism, the combination of a series of indicators normally resting in non-indicating position, a series of keys for setting or locating them for movement to indicating position, a money drawer having a movable member, and means actuated by said member to display the indicators after they have been set by their respective keys, substantially as described.

28. In an indicating mechanism, the combination of a series of indicators normally resting in non-indicating position, a series of keys for setting or locating them for movement to indicating position, a fixed money drawer having a movable cover, and means actuated by said cover to display the indicators after they have been set by their respective keys, substantially as described.

29. In an indicating mechanism, the combination of a series of indicators normally resting in non-indicating position but tending to move into indicating position, means for holding them from such movement, a series of keys for setting them for movement, and means operating independently of the keys to permit them to move to indicating position after having been set by their respective keys, substantially as described.

30. In an indicating mechanism, the combination of a series of indicators normally resting in non-indicating position, a movable rod or bar common to said indicators, for moving them in one direction, means for setting the respective indicators for movement to indicating position, and means operating independently of the setting means to display the respective indicators after they have been set, substantially as described.

31. In an indicating mechanism, the combination of a series of indicators normally resting in non-indicating position, a movable rod or bar common to said indicators, for moving them in one direction, means for setting the respective indicators for movement to indicating position, a money drawer having a movable member, and means actuated by such member to display the respective indicators after they have been set, substantially as described.

32. In an indicating mechanism, the combination of a series of indicators normally resting in non-indicating position, a movable rod or bar common to said indicators, for moving them in one direction, a series of keys for setting the respective indicators for movement to indicating position, and means operating independently of the keys to display the indicators after they have been set by the keys, substantially as described.

33. In an indicating mechanism, the combination of a series of indicators normally resting in non-indicating position, a movable rod or bar common to said indicators, for moving them in one direction, a series of keys for setting the respective indicators for movement to indicating position, and a money drawer or receptacle having a movable member co-operating with the rod or bar common to the indicators, to display the latter after they have been set by the keys, substantially as described.

34. In an indicating mechanism, the combination of a series of indicators normally resting in non-indicating position but tending to move into indicating position, a movable bar or rod for moving them to non-indicating position after having been displayed, means for setting them for movement to indicating position, and means co-operating with the movable rod or bar to permit them to move to indicating position after having been set by such movement, substantially as described.

35. In an indicating mechanism, the combination of a series of indicators normally resting in non-indicating position but tending to move into indicating position, a movable bar or rod for moving them to indicating position after having been displayed, a series of keys for setting them for movement to indicating position, and means co-operating with the movable rod or bar to permit them to move to indicating position after being set by the keys, substantially as described.

36. In an indicating mechanism, the combination of a series of indicators normally resting in non-indicating position, springs tending to move them to indicating position, means for releasably holding them in non-indicating position, a movable rod or bar common to the indicators for restoring them to indicating position after being displayed, a series of keys for setting them for movement to indicating position, and means for releasing them and permitting them to so move after being set by the keys, substantially as described.

37. In an indicating mechanism, the combination of a series of indicators normally resting in non-indicating position, springs tending to move them to indicating position, means for releasably holding them in non-indicating position, a movable rod or bar common to the indicators for restoring them to indicating position after being displayed, a series of keys for setting them for movement to indicating position, a money drawer having a movable member, and means actuated by said member for releasing the indicators and permitting them to move to indicating position after having been set by the keys, substantially as described.

38. In an indicating mechanism, the combination of a series of indicators normally resting in non-indicating position, springs tending to move them to indicating position, a movable rod or bar for restoring them to non-indicating position after being displayed, a series of detents for releasably holding them in such position, a series of keys co-operating with the detents to release them, and a money drawer having a movable member co-operating with the rod or bar common to the indicators to permit the latter to move to indicating position after being set by the keys, substantially as described.

39. In an indicating mechanism, the combination of a series of indicators normally resting in non-indicating position but tending to move to indicating position, a movable rod or bar common to the indicators for restoring them to non-indicating position after being displayed, a series of detents for releasably holding them in non-indicating position, and a series of keys co-operating with the movable rod or bar to restore the displayed indicators to non-indicating position, and with the detents to release the indicators corresponding to the newly operated keys, substantially as described.

40. In an indicating mechanism, the combination of the spring-actuated indicators G having the arms or fingers 30, the key levers 3, the arms 34 provided with notches $m$ and projections or fingers 35, and the reciprocating rod 31 co-operating with the arms 34 and indicator fingers 30, substantially as described.

41. In a cash register, the combination of a series of operating keys representing different values, a series of indicators co-operating therewith to indicate their respective values an independent printing device for each key, for printing its value upon a paper strip when the key is operated, an independent feeding mechanism for each key, for moving a paper strip past the printing point of such key when the key is operated, and a cutter actuated by the key to sever the strip whereby when any key is operated its value is printed upon its corresponding paper strip and the strip advanced from the printing point and the printed ticket cut therefrom, substantially as described.

42. In a cash indicator and check printer, the combination of an indicator normally resting in non-indicating position, a printing device, an operating key or lever for setting or locating the indicator for movement to indicating position and printing the value thereof upon a paper strip, and means operating independently of the key to display the indicator after it has been set or located by the key, substantially as described.

43. In a cash indicator and check printer, the combination of an indicator normally resting in non-indicating position, a printing device for printing its value upon a paper strip, a key or lever operating upon its positive stroke to set or locate the indicator for movement to indicating position and to print its value upon the paper strip, a money drawer or receptacle, and means intermediate a moving part thereof and the indicator for displaying the latter at the movement of such member after the indicator has been set by the key or lever, substantially as described.

44. In a cash indicator and check printer, the combination of a series of indicators normally resting in non-indicating position, printing mechanism for printing the values of the respective indicators, means for setting the respective indicators for movement to indicating position and for printing their values, and means for displaying the respective indicators after they have been set and their values printed, substantially as described.

45. In a cash indicator and check printer, the combination of a series of indicators normally resting in non-indicating position, printing mechanism for printing the values of the respective indicators, means for setting the respective indicators for movement to indicating position and for printing their values, a money drawer or receptacle, and means intermediate a movable member thereof and the indicators for displaying the latter after they have been set by the keys, substantially as described.

46. In a cash indicator and check printer, the combination of a series of indicators representing different values, printing mechanism for printing their respective values, a series of operating keys for setting the indicators for movement to indicating position and for printing their values, and means operating independently of the keys to display the indicators after they have been set by the keys, substantially as described.

47. In a cash register and check printer, the combination of a series of indicators representing different values, printing mechanism for printing their respective values, a series of operating keys for setting the indicators for movement to indicating position and for printing their values, a money drawer or receptacle, and means intermediate a movable part thereof and the indicators for displaying the latter after they have been set by the keys, substantially as described.

48. The combination of the toothed wheels, keys, key levers, pawls and carriers, of a locking arm for each carrier, and a pin 19 on the key lever arranged to prevent the movement of the locking arm except when the key is in its normal position, substantially as set forth.

49. The combination of the wheels, keys, levers 4 with fulcra co-inciding with the axis of the wheels, pawls 2, and arms 16 movable to and from the pawls, and detents for holding said arms, substantially as described.

50. The combination of the wheels A connected with the register, levers 4 and differently located stops therefor, pawls carried by said levers, locking arms 16 recessed at the upper ends, and keys and key levers having detent pins 19, substantially as and for the purpose set forth.

51. The combination, with the keys, wheels A and operating pawls of a register device, of detent levers having shoulders arranged to engage projections of the key levers, and stops carried with the pawls and arranged to make contact with and move and hold back the detent levers as the pawls complete their movements, substantially as set forth.

52. The combination, with the register, wheels, key levers and pawls and carriers operated by the key levers to turn the wheels, of detaining arms provided with shoulders arranged to engage pins on the key levers, and a projection on each pawl or carrier arranged to bear and hold back the detent arm only as the pawl reaches its lowest position, substantially as set forth.

53. The combination, with the key levers, of a series of slotted locking plates, each plate having all its slots except one in line with the lever above and one slot out of line and with an inclined edge, and means for returning the slotted plate to its normal position after the key which has actuated said plate has completed its stroke and returned to its normal position, and a bolt for locking the locking plates in place, for the purpose set forth.

54. In a cash register, a series of indicators mechanism controlled by the operator for locating one or more indicators in position preparatory to display, and a money receptacle having a movable part adapted to actuate said indicators and cause the display of the same, substantially as set forth.

55. In a cash register, a series of indicators, mechanism controlled by the operator for locking one or more indicators in position preparatory to display, means for retaining said indicators in said position, and a money receptacle having a movable part adapted to actuate said retaining means and cause the display of said indicators, substantially as set forth.

56. In a cash register, the combination, with a series of indicators and with a money receptacle, of connections between the same operated by the movement of a movable part of said receptacle for actuating and displaying said indicators, substantially as set forth.

57. In a cash register, the combination, with a series of indicators, of mechanism controlled by the operator for locating one or more indicators in position preparatory to display, and for removing the previously exposed indicator or indicators from view, and actuating devices adapted to be operated to display the said located indicators, substantially as set forth.

58. In a cash register, the combination, with a series of indicators, and a money receptacle in operative connection therewith, and a key for locating the proper indicator in position preparatory to display, and actuating devices operated by a movable part of said receptacle to cause the display of the set indicator, substantially as described.

59. The combination, with the keys and key levers and indicators, of connections between the said levers and indicators for moving the latter, and a money receptacle and connections for moving the indicators to a different position on the opening or closing of the receptacle, substantially as described.

60. The combination of a series of keys, corresponding indicators, retaining devices therefor, and connections between each key and one of said retainers whereby one or more of the latter may be set without exposing the indicators on depressing one or more keys, and indicator-operating devices whereby all the set retainers may be actuated to expose the corresponding indicators after the keys have been struck and released, substantially as set forth.

61. The combination, with the keys, indicators, and cash receptacle, of connections between each key and the indicator for restoring displaced indicators to position on the depression of a key, and connections between the receptacle and the indicators for releasing and exposing the indicator as the receptacle or a movable part thereof is moved, substantially as set forth.

62. The combination, with the keys and indicators of a cash register, of a receptacle provided with a movable lid or cover, detents for holding the indicators in one position, and connections between the movable cover and detents for releasing the indicators by the movement of the cover, substantially as set forth.

63. The combination of the keys, indicators, receptacle movable lid 125, cam $n$, and connections arranged to be operated by said cam to move the indicators, substantially as set forth.

64. The combination of the keys, indicators, detents for detaining the indicators in one position, connections between the keys and detents for setting the same in position, and the receptacle and connections between the movable part thereof and the detents for throwing the latter out of engagement with the indicators, substantially as described.

65. The combination, with the movable indicators having fingers 30, of a notched rod 34 connected with each key and having a finger 35, and a movable cross bar 31, said finger being in contact with said cross bar upon the depression of a key so as to hold the indicator concealed, for the purpose set forth.

66. The combination of the movable indicators, detents in the form of rods 34 each provided with a dog 37, and a movable cross bar 40 hung opposite the said dog and connected with the movable receptacle or lid to be moved thereby, substantially as set forth.

67. The combination, with the keys and pivoted indicators, of detaining rods 34 arranged to bear on projections of the indicators and provided with fingers 35 and dogs 37, and a movable bar 40 connected with the movable part of a cash receptacle and arranged in position to make contact with the dogs, substantially as set forth.

68. The combination, with the keys of a register, of tablets each hung to swing on a pivot, provided with a curved plate and arranged one within the other, substantially as set forth.

69. The combination, in a register, of indicators pivoted to a cross bar or axis 29 and each consisting of a curved plate 28, said plates in pairs swinging one within the other about the same axis and opposite the same plate of the sight opening, substantially as set forth.

70. In a cash register, in combination, a series of indicators, a key for locating the proper indicator in position preparatory to display, and a transverse bar adapted to be actuated by said key and to engage a previously exposed indicator and remove the same from view, a money receptacle, and connections between said indicators and said receptacle adapted to be operated by the movement of a movable part of said receptacle to display the said located indicator, substantially as described.

71. In a cash register, in combination, a series of indicators, mechanism controlled by the operator and adapted to locate one or more indicators in position preparatory to display, and actuating devices adapted to be operated, after the appropriate indicator or indicators have been located, to display the said located indicators, substantially as described.

72. In a cash register, the combination, with a series of indicators, of mechanism for locating one or more indicators in position preparatory to display, and a movable rod adapted when actuated to cause the display of the set indicators, and means for actuating the said rod, substantially as described.

73. The combination, with the keys and indicators, and with the drawer cover or other movable part of the register, of connections between the cover and the indicators to move the latter to a displayed position by the movement of the cover, and connections between the indicators and keys whereby the indicators are restored to a concealed position on the movement of any key, substantially as described.

In testimony whereof we have signed our names to this specification in the presence of two subscribing witnesses.

LEO EHRLICH.
     JOHN B. BENTON.

Witnesses to the signature of Leo Ehrlich:
 E. S. KNIGHT,
 THOMAS KNIGHT.

Witnesses to the signature of John B. Benton:
 HY HUFFMAN BROWNE,
 JAMES A. DONEGAN.